US012779796B2

(12) United States Patent
Lee et al.

(10) Patent No.: US 12,779,796 B2
(45) Date of Patent: Nov. 3, 2026

(54) APPARATUS AND METHOD FOR MANUFACTURING HYDROGEN TANK

(71) Applicants: Hyundai Motor Company, Seoul (KR); Kia Corporation, Seoul (KR)

(72) Inventors: Kyuyoung Lee, Ulsan (KR); JunSik Choi, Ulsan (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 128 days.

(21) Appl. No.: 18/619,446

(22) Filed: Mar. 28, 2024

(65) Prior Publication Data

US 2025/0144896 A1 May 8, 2025

(30) Foreign Application Priority Data

Nov. 3, 2023 (KR) ........................ 10-2023-0150872

(51) Int. Cl.
*B29C 70/52* (2006.01)
*B29C 53/56* (2006.01)
*B29L 31/00* (2006.01)

(52) U.S. Cl.
CPC .......... *B29C 70/521* (2013.01); *B29C 53/566* (2013.01); *B29L 2031/7156* (2013.01)

(58) Field of Classification Search
CPC ....... B29C 53/56; B29C 53/58; B29C 53/562; B29C 70/52; B29C 70/521; B29C 70/525
See application file for complete search history.

(56) References Cited

U.S. PATENT DOCUMENTS

2020/0078996 A1* 3/2020 Kämereit ................ B29C 45/36
2024/0151363 A1* 5/2024 Lee ....................... F17C 11/005

FOREIGN PATENT DOCUMENTS

CN 115139553 * 10/2022
JP H0834066 B2 * 3/1996 .......... C10M 133/16
KR 102282688 B1 7/2021

OTHER PUBLICATIONS

Yang, J., et al., "Development of a Platic Pipe by Using Water Injection Technology," KSAE13-AO437, KSAE 2013 Annual Conference, 4 total pages.

* cited by examiner

*Primary Examiner* — Alison L Hindenlang
*Assistant Examiner* — Debjani Roy
(74) *Attorney, Agent, or Firm* — Slater Matsil, LLP

(57) ABSTRACT

In an apparatus, and corresponding method, for manufacturing a hydrogen tank, the apparatus may include a molding device configured to form a hollow cylindrical initial resin material body by solidifying a liquid resin material, a winding device provided at a downstream side of the molding device and configured to form an intermediate material by winding a carbon fiber around an outer surface of the initial resin material body formed by the molding device, a rotation device provided at a downstream side of the winding device and configured to impregnate an epoxy resin with the initial resin material body and the carbon fiber by rotating the intermediate material formed by the winding device, and a pultrusion device provided at a downstream side of the rotation device and configured to stretch the intermediate material, which has passed through the rotation device, in a longitudinal direction.

12 Claims, 14 Drawing Sheets

APPARATUS AND METHOD FOR MANUFACTURING HYDROGEN TANK

CROSS-REFERENCE TO RELATED APPLICATIONS

This application claims priority to and the benefit of Korean Patent Application No. 10-2023-0150872 filed in the Korean Intellectual Property Office on Nov. 3, 2023, the entire contents of which are incorporated herein by reference.

TECHNICAL FIELD

The present disclosure relates to an apparatus and method for manufacturing a hydrogen tank.

BACKGROUND

Recently, as environmental pollution has become a major issue, electric vehicles, hydrogen vehicles, and hybrid vehicles, which are environmental-friendly vehicles that do not use fossil fuel, have been actively developed.

The hydrogen vehicle uses hydrogen as fuel for a vehicle. The advantage of hydrogen is that only a very small amount of nitrogen oxide is produced by combustion, and no other harmful substances are produced. In addition, hydrogen may be an infinite energy source that is not depleted because hydrogen is made from the infinite amount of water existing on the Earth and recycled back into water after use. Therefore, hydrogen is in the limelight as fuel for environmental-friendly vehicles.

Because the hydrogen vehicle uses hydrogen as fuel, a main component of an exhaust gas is water, and very few harmful substances are not emitted, except for a small amount of nitrogen oxides.

A hydrogen storage tank (or a hydrogen tank) is used to store hydrogen in a vehicle, and various complicated processes are required to manufacture the hydrogen tank. The complicated processes required to manufacture the hydrogen tank cause a problem of an increase in costs required to manufacture the vehicle.

The above information disclosed in this Background section is only for enhancement of understanding of the background of the present disclosure and therefore it may contain information that does not form the prior art that is already publicly known, available, or in use.

SUMMARY

The present disclosure relates to an apparatus and method for manufacturing a hydrogen tank, and more particularly, to an apparatus and method for manufacturing a cylindrical hydrogen tank.

Some embodiments of the present disclosure can provide an apparatus and method for manufacturing a hydrogen tank, which can be capable of manufacturing a hydrogen tank by using a simple process to reduce costs required to manufacture a vehicle.

An apparatus for manufacturing a hydrogen tank according to an embodiment of the present disclosure may include a molding device configured to form a hollow cylindrical initial resin material body by solidifying a liquid resin material, a winding device provided at a downstream side of the molding device and configured to form an intermediate material by winding a carbon fiber around an outer surface of the initial resin material body formed by the molding device, a rotation device provided at a downstream side of the winding device and configured to impregnate an epoxy resin with the initial resin material body and the carbon fiber by rotating the intermediate material formed by the winding device, and a pultrusion device provided at a downstream side of the rotation device and configured to stretch the intermediate material, which has passed through the rotation device, in a longitudinal direction.

In several embodiments, the molding device may include a molding body having resin inlets through which the resin material is introduced, a molding outlet through which the initial resin material body is discharged, and a molding hole formed in the molding body and corresponding to an outer surface of a hydrogen tank, and a mandrel provided in the molding hole of the molding body and having a shape corresponding to an inner surface of the hydrogen tank.

In several embodiments, the molding body may include a first molding body having a first molding groove, and a second molding body provided below the first molding body and having a second molding groove, and the first molding groove and the second molding groove may collectively define the molding hole.

In several embodiments, the resin inlet may be formed in an upper portion of the first molding body.

In several embodiments, the resin inlets may be respectively formed in the first molding body and the second molding body.

In several embodiments, a pressure of the resin material introduced through the resin inlet formed in the second molding body may be higher than a pressure of the resin material introduced through the resin inlet formed in the first molding body.

In several embodiments, the winding device may include a winding body having a winding hole formed therein, a winding inlet formed in the winding body and configured to allow the initial resin material body to be introduced through the winding inlet, a winding outlet formed in the winding body and configured to allow the intermediate material to be discharged through the winding outlet, and a carbon fiber inlet formed in the winding body and configured to allow the carbon fiber and the epoxy resin to be introduced through the carbon fiber inlet.

In several embodiments, the winding body may include a first winding body having a first winding groove, and a second winding body having a second winding groove, and the first winding groove and the second winding groove may collectively define the winding hole.

In several embodiments, the rotation device may include a rotation body having a rotation hole formed therein, a rotation inlet formed in the rotation body and configured to allow the intermediate material, which is discharged from the winding device, to be introduced through the rotation inlet, a rotation outlet formed in the rotation body and configured to allow the intermediate material, which passes through the rotation body, to be discharged through the rotation outlet, a plurality of inlet rollers provided in the rotation inlet and configured to guide the intermediate material in a circumferential direction, and a plurality of outlet rollers provided in the rotation outlet and configured to guide the intermediate material in a circumferential direction.

In several embodiments, the rotation body may include a first rotation body having a first rotation groove, and a second rotation body having a second rotation groove, and the first rotation groove and the second rotation groove may collectively define the rotation hole.

In several embodiments, the inlet rollers and the outlet rollers may rotate while applying a preset pressure in a diameter direction of the intermediate material.

In several embodiments, the pultrusion device may include a pultrusion body having a pultrusion hole formed therein, the pultrusion body having a pultrusion inlet through which the intermediate material discharged from the rotation device is introduced, and a pultrusion outlet through which the intermediate material is discharged, and a plurality of pultrusion rollers provided in the pultrusion body and provided in a longitudinal direction of the intermediate material having passed through the rotation device.

In several embodiments, the pultrusion rollers may rotate while applying a predetermined pressure to the intermediate material passing through the pultrusion hole.

In several embodiments, the winding device and the molding device may be positioned adjacent to each other.

A method of manufacturing a hydrogen tank according to an embodiment of the present disclosure may include forming, by a molding device, a hollow cylindrical initial resin material body by solidifying a liquid resin material, forming, by a winding device, an intermediate material by winding a carbon fiber around an outer surface of the initial resin material body, impregnating, by a rotation device, an epoxy resin with the initial resin material body and the carbon fiber by rotating the intermediate material, and stretching, by a pultrusion device, the intermediate material in a longitudinal direction.

In several embodiments, in the forming of the intermediate material, the carbon fiber and the epoxy resin may be introduced through a carbon fiber inlet formed in the winding device.

According to some embodiments, the molding process of forming the initial resin material body (liner) used to manufacture the hydrogen tank, the winding process of winding the carbon fiber around the initial resin material body, the rotation process of impregnating the epoxy material with the initial resin material body and the carbon fiber, and the pultrusion process of stretching the intermediate material may be implemented by a single continuous process.

Other advantages, which may be obtained or expected by some embodiments of the present disclosure, will be directly or implicitly disclosed in the detailed description of the present disclosure. That is, various advantages expected according to some embodiments of the present disclosure will be disclosed in the detailed description to be described below.

BRIEF DESCRIPTION OF THE DRAWINGS

Because the drawings are provided for reference to describe example embodiments of the present disclosure, the technical spirit of the present disclosure should not be construed as being necessarily limited to the accompanying drawings.

Figure 1:
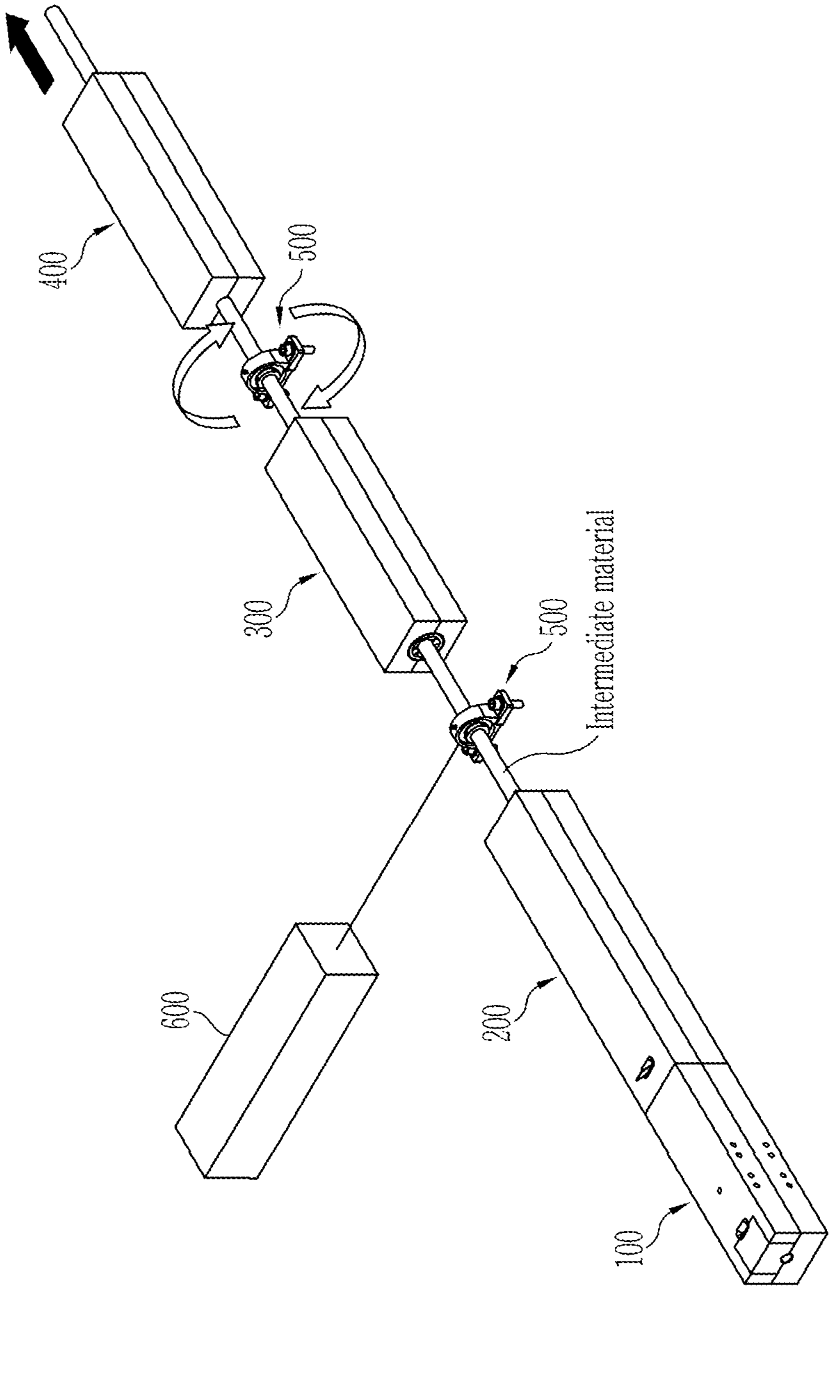
FIG. 1 is a perspective view illustrating an apparatus for manufacturing a hydrogen tank according to an embodiment of the present disclosure.

The accompanying drawings are not necessarily to scale, but provide a somewhat simplified representation of various preferred features that exemplify principles of the present disclosure. For example, specific design features of an embodiment of the present disclosure, including particular dimensions, directions, positions, and shapes, can be partially determined by the particularly intended application and use environment.

DETAILED DESCRIPTION OF ILLUSTRATIVE EMBODIMENTS

The terms used herein can be merely for the purpose of describing example embodiments, and not intended to necessarily limit the present disclosure. Singular expressions used herein can include plural expressions unless the context clearly dictates otherwise. It can be understood that the term "comprise (include)" and/or "comprising (including)" used in the present specification means that the features, the integers, the steps, the operations, the constituent elements, and/or component are present, but the presence or addition of one or more of other features, integers, steps, operations, constituent elements, components, and/or groups thereof is not excluded. The term "and/or" used herein includes any one or all the combinations of listed related items.

The present disclosure will be described in detail with reference to the accompanying drawings so that those with ordinary skill in the art to which the present disclosure pertains may easily carry out embodiments. However, the present disclosure may be implemented in various different ways and is not limited to the example embodiments described herein.

A part irrelevant to the description can be omitted to clearly describe the present disclosure, and same or similar constituent elements can be designated by same reference numerals throughout the specification.

In addition, the size and thickness of each component illustrated in the drawings are arbitrarily shown for ease of description, but the present disclosure is not limited thereto. To clearly describe several portions and regions, thicknesses thereof are enlarged.

The suffixes 'module', 'unit', 'part', and/or 'portion' used to describe constituent elements in the following description can be used together or interchangeably to facilitate the description, but the suffixes themselves do not have distinguishable meanings or functions.

In addition, in the description of the disclosed example embodiments, the specific descriptions of publicly known related technologies can be omitted when it is determined that the specific descriptions may obscure the subject matter of the embodiment disclosed in the present specification.

In addition, it can be interpreted that the accompanying drawings are provided to allow those skilled in the art to easily understand the example embodiments disclosed in the present specification, and the technical spirit disclosed in the present specification is not necessarily limited by the accompanying drawings, and can include all alterations, equivalents, and alternatives that are included in the spirit and the technical scope of the present disclosure.

The terms including ordinal numbers such as "first," "second," and the like, may be used to describe various constituent elements, but the constituent elements are not necessarily limited by such terms. Such terms can be used merely to distinguish one constituent element from another constituent element.

In the following description, the singular expression "one" or "single" may be interpreted as the singular or plural expression unless explicitly stated.

In the flowchart described with reference to the drawings, an operational sequence may be changed, multiple operations may be combined, any operation may be separated, and a particular operation may not be performed.

Hereinafter, an apparatus for manufacturing a hydrogen tank according to example embodiments will be described in detail with reference to the accompanying drawings.

FIG. 1 is a perspective view illustrating an apparatus for manufacturing a hydrogen tank according to an embodiment of the present disclosure.

As illustrated in FIG. 1, an apparatus for manufacturing a hydrogen tank according to an embodiment may include a molding device 100, a winding device 200, a rotation device 300, and a pultrusion device 400 that are sequentially positioned, any combination of or all of which may be in plural or may include plural components thereof. The molding device 100 and the winding device 200 may be positioned adjacent to each other.

The molding device 100 may form a hollow cylindrical initial resin material body by introducing a liquid resin material and solidifying the liquid resin material. The resin material may be glass fiber reinforced polyamide 6 (PA6), for example. In the embodiment, the liquid resin material, which is introduced into the molding device 100 and solidified, is referred to as the initial resin material or the initial resin material body. The initial resin material is also called a liner and can serve as a structure having an outer surface around which a carbon fiber may be wound.

The winding device 200 can be provided at a downstream side of the molding device 100 and can form an intermediate material by winding a carbon fiber (CF) around the outer surface of the initial resin material formed by the molding device 100. In the embodiment, the initial resin material having the outer surface around which the carbon fiber can be wound by the winding device 200 can be referred to as the intermediate material.

The rotation device 300 can be provided at a downstream side of the winding device 200 and can impregnate the carbon fiber with the initial resin material by rotating the intermediate material formed by the winding device 200.

The pultrusion device 400 can be provided at a downstream side of the rotation device 300 and can stretch the intermediate material, which has passed through the rotation device 300, in a longitudinal direction.

Figure 2:
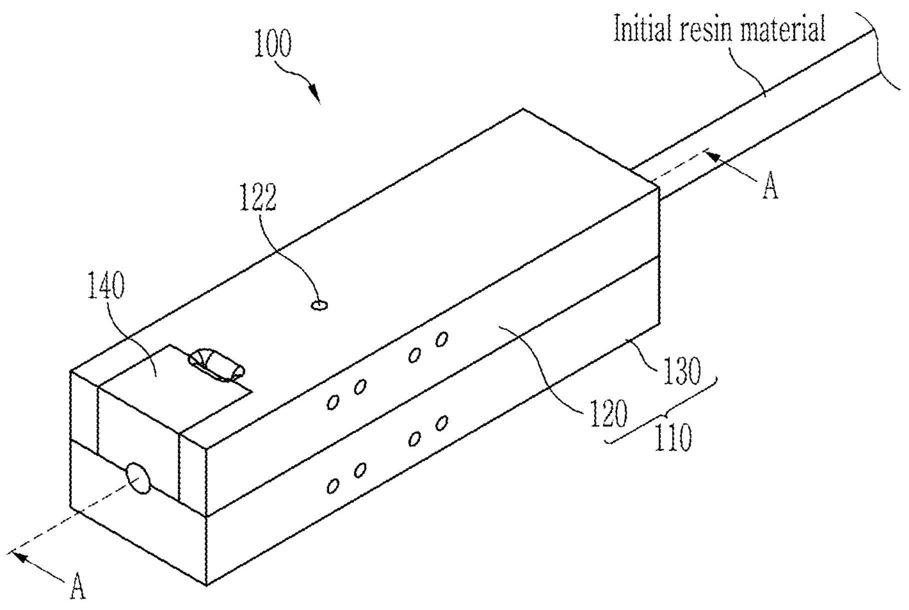
FIG. 2 is a perspective view illustrating a configuration of a molding device according to an embodiment of the present disclosure.
Figure 3:
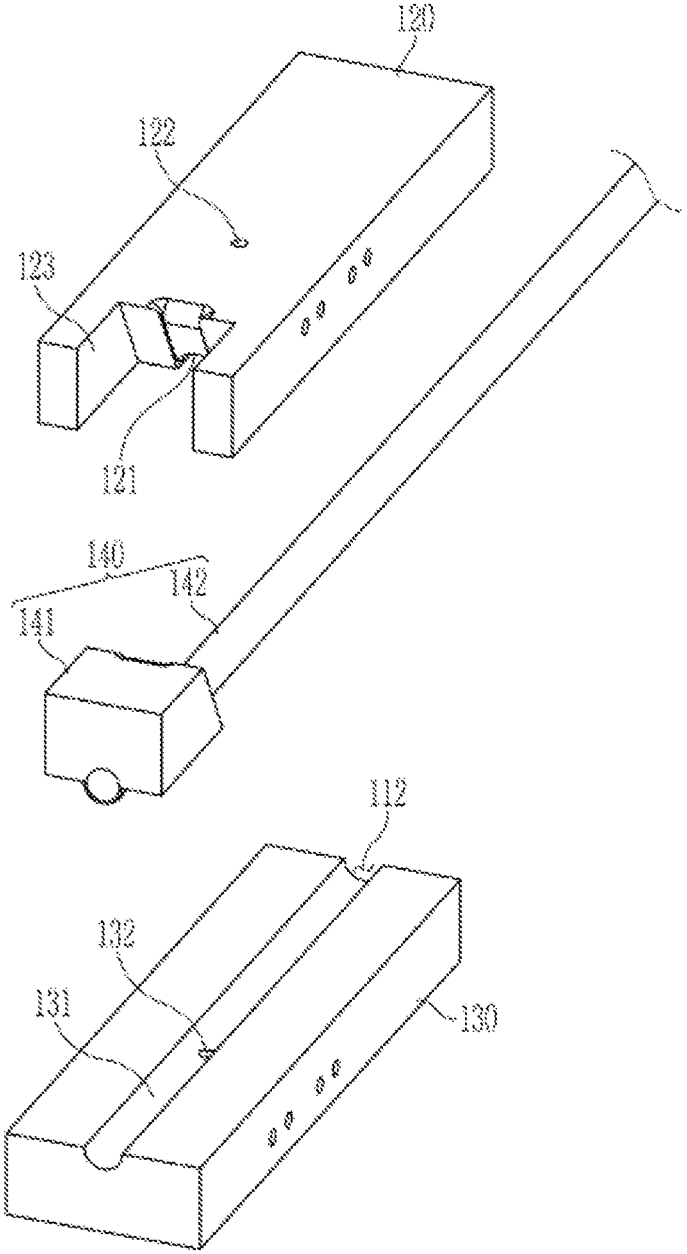
FIG. 3 is an exploded perspective view illustrating a configuration of a molding device according to an embodiment of the present disclosure.

FIG. 2 is a perspective view illustrating a configuration of the molding device according to an embodiment of the present disclosure. FIG. 3 is an exploded perspective view illustrating the configuration of the molding device according to an embodiment of the present disclosure. Further, FIG. 4 is a cross-sectional view taken along line "A-A" in FIG. 2 according to an embodiment of the present disclosure.

Figure 4:
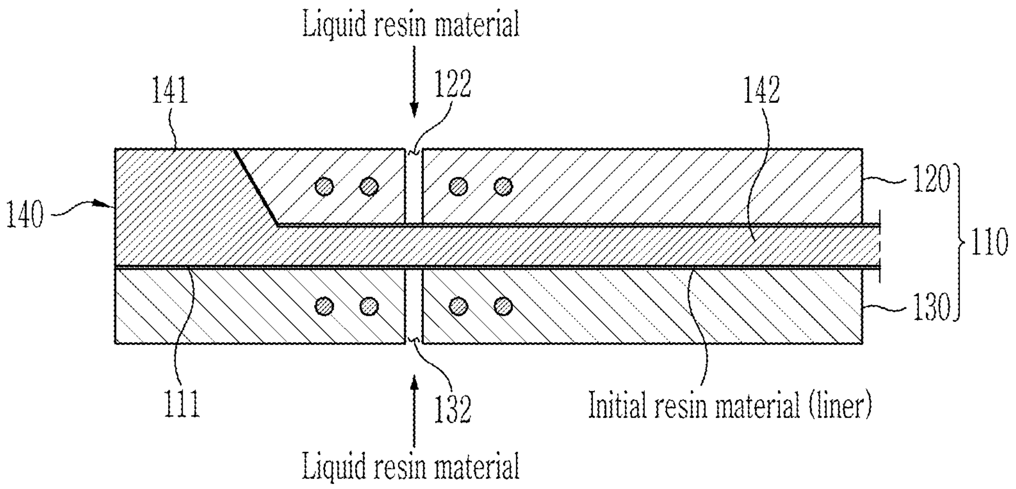
FIG. 4 is a cross-sectional view taken along line "A-A" in FIG. 2 according to an embodiment of the present disclosure.

With reference to FIGS. 2 to 4, the molding device 100 may include a molding body 110, and a mandrel 140 provided in the molding body 110.

The molding body 110 may include a resin inlet into which the liquid resin material can be introduced, a molding outlet 112 through which the initial resin material made by solidifying the resin material can be discharged, and a cylindrical molding hole 111 configured to correspond to an outer surface of a hydrogen tank.

The molding body 110 may include a first molding body 120, and a second molding body 130 provided below the first molding body 120.

The first molding body 120 can be provided in the form of an approximately quadrangular block, and a first molding groove 121 having a cross-section with a semicircular shape can be formed in a lower portion of the first molding body 120. The second molding body 130 can be provided in the form of an approximately quadrangular block, and a second molding groove 131 having a cross-section with a semicircular shape can be formed in an upper portion of the second molding body 130. The first molding groove 121 and the second molding groove 131 may collectively define the cylindrical molding hole 111. The molding outlet 112 may be formed at a downstream side end of the molding hole 111.

A resin inlet (referred to as a 'first resin inlet 122', as necessary) may be formed in an upper portion of the first molding body 120 and communicate with the molding hole 111. As necessary, another resin inlet (referred to as a 'second resin inlet 132', as necessary) may be formed in the lower portion of the second molding body 130 and communicate with the molding hole 111. A support groove 123 can be formed in an upstream side upper portion of the first molding body 120. The support groove 123 communicates with the molding hole 111.

The mandrel 140 may be provided in the molding hole 111 of the molding body 110 and include a seating portion seated in the support groove 123 of the first molding body 120, and an extension portion 142 extending from the seating portion and formed in a cylindrical shape corresponding to an inner surface of the hydrogen tank.

The seating portion may be seated in the support groove 123 of the molding body 110, such that the extension portion 142 may be supported in a longitudinal direction in the molding hole 111.

An empty space can be formed between an outer surface of the extension portion 142 of the mandrel 140 and an inner surface of the molding hole 111, and the initial resin material can be formed as the empty space can be filled with the resin material introduced through the resin inlet.

Because the extension portion 142 of the mandrel 140 can be formed in a cylindrical shape having a long length, an end of the extension portion 142 may be bent in the gravitational direction by its weight. When the end of the extension portion 142 is bent, eccentricity may occur at a center of the hydrogen tank, and a thickness of the hydrogen tank may not be uniform.

To solve this problem, an injection pressure (first injection pressure) of the resin material introduced through the second resin inlet 132 may be set to be higher than an injection pressure (second injection pressure) of the resin material introduced through the first resin inlet 122. For example, the second injection pressure may be set to be about 10% of the first injection pressure, such that the mandrel 140 may be pushed upward in a direction opposite to the gravitational direction. Therefore, it can be possible to prevent the extension portion 142 of the mandrel 140 from being bent in the gravitational direction. Therefore, the initial resin material may be formed in an accurately cylindrical shape with a constant thickness.

Figure 5:
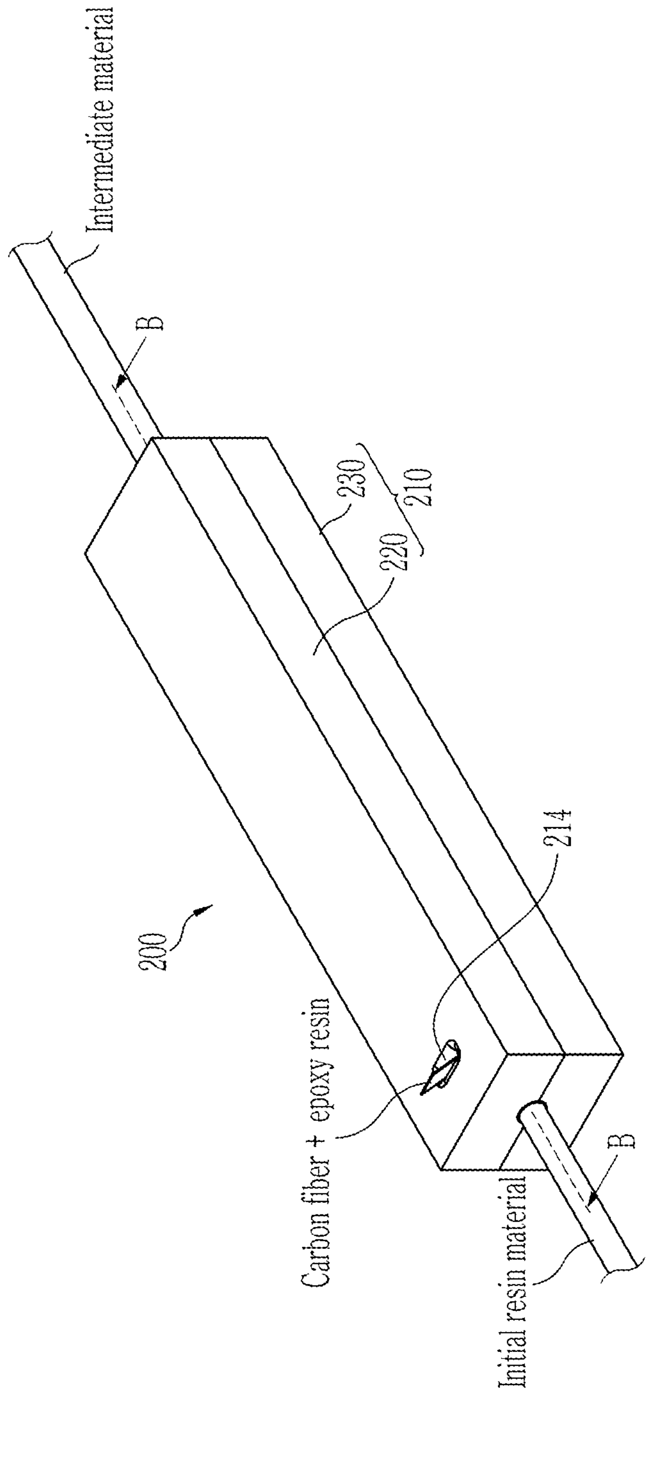
FIG. 5 is a perspective view illustrating a configuration of a winding device according to an embodiment of the present disclosure.
Figure 6:
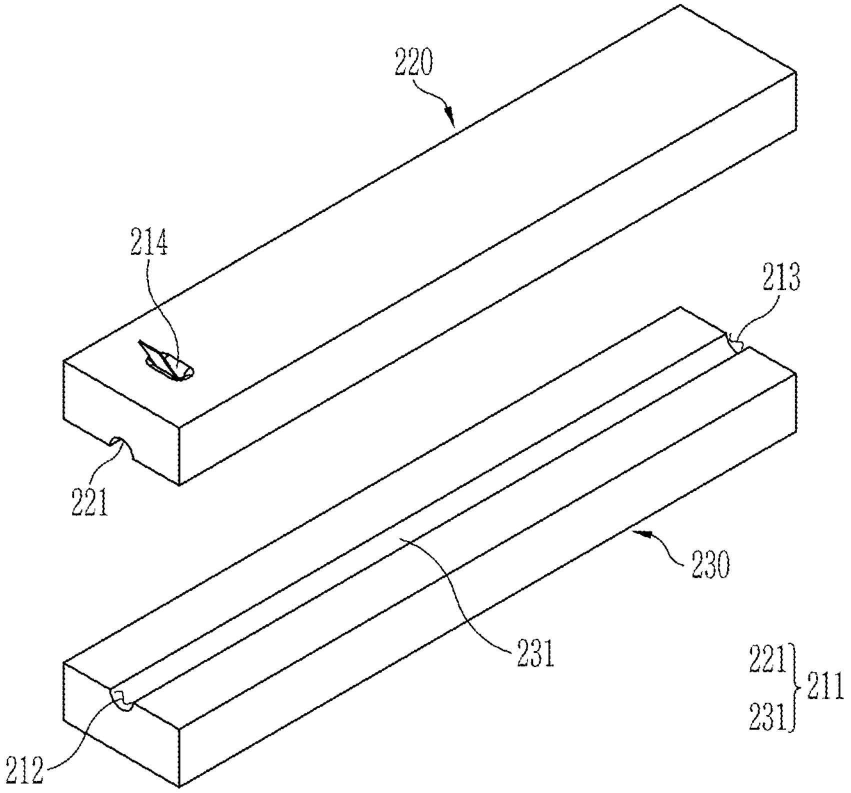
FIG. 6 is an exploded perspective view illustrating a configuration of a winding device according to an embodiment of the present disclosure.

FIG. 5 is a perspective view illustrating a configuration of the winding device according to an embodiment of the present disclosure. FIG. 6 is an exploded perspective view illustrating a configuration of a winding device according to an embodiment of the present disclosure. Further, FIG. 7 is a cross-sectional view taken along line "B-B" in FIG. 5 according to an embodiment of the present disclosure.

Figure 7:
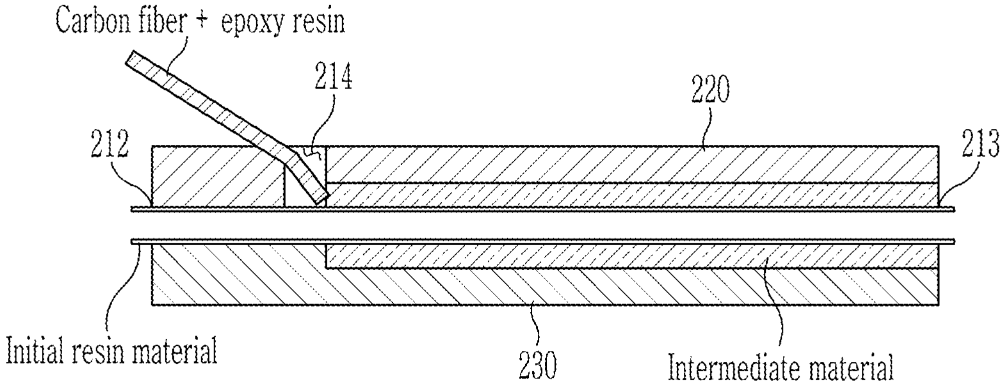
FIG. 7 is a cross-sectional view taken along line "B-B" in FIG. 5 according to an embodiment of the present disclosure.

With reference to FIGS. 5 to 7, the winding device 200 may include a winding body 210, a winding inlet 212 formed in the winding body 210 and configured to allow the initial resin material to be introduced through the winding inlet 212, a winding outlet 213 formed in the winding body 210 and configured to allow the intermediate material to be discharged through the winding outlet 213, and a carbon fiber inlet 214 formed in the winding body 210 and configured to allow the carbon fiber to be introduced through the carbon fiber inlet 214.

The winding body 210 may be provided in the form of an approximately quadrangular block, and a cylindrical winding hole 211, in which the initial resin material may move, may be formed in the winding body 210.

The winding body 210 may include a first winding body 220, and a second winding body 230 provided below the first winding body 220.

The first winding body 220 can be provided in the form of an approximately quadrangular block, and a first winding groove 221 having a cross-section with a semicircular shape can be formed in a lower portion of the first winding body 220. The second winding body 230 can be provided in the form of an approximately quadrangular block, and a second winding groove 231 having a cross-section with a semicircular shape can be formed in an upper portion of the second winding body 230. The first winding groove 221 and the second winding groove 231 may collectively define the cylindrical winding hole 211. A diameter of the winding hole 211 can be larger than an outer diameter of the initial resin material. The winding inlet 212 can be formed at an upstream side of the winding hole 211, and the winding outlet 213 can be formed at a downstream side of the winding hole 211.

The carbon fiber inlet 214 may be positioned in an upper portion of the winding body 210.

The winding inlet 212 of the winding device 200 may be positioned to face the molding outlet 112 of the molding device 100. The molding device 100 and the winding device 200 may be positioned adjacent to each other. For example, the molding device 100 and the winding device 200 may be positioned to be in close contact with each other. Therefore, the molding outlet 112 of the molding device 100 and the winding inlet 212 of the winding device 200 may be provided to be in close contact with each other.

The carbon fiber and an epoxy resin, which is a bonding agent, may be introduced into the winding hole 211 through the carbon fiber inlet 214. An empty space can be formed between an inner surface of the winding hole 211 and an outer surface of the initial resin material. The carbon fiber introduced between the winding hole 211 and the outer surface of the initial resin material can surround the outer surface of the initial resin material, such that the intermediate material can be formed.

Figure 8:
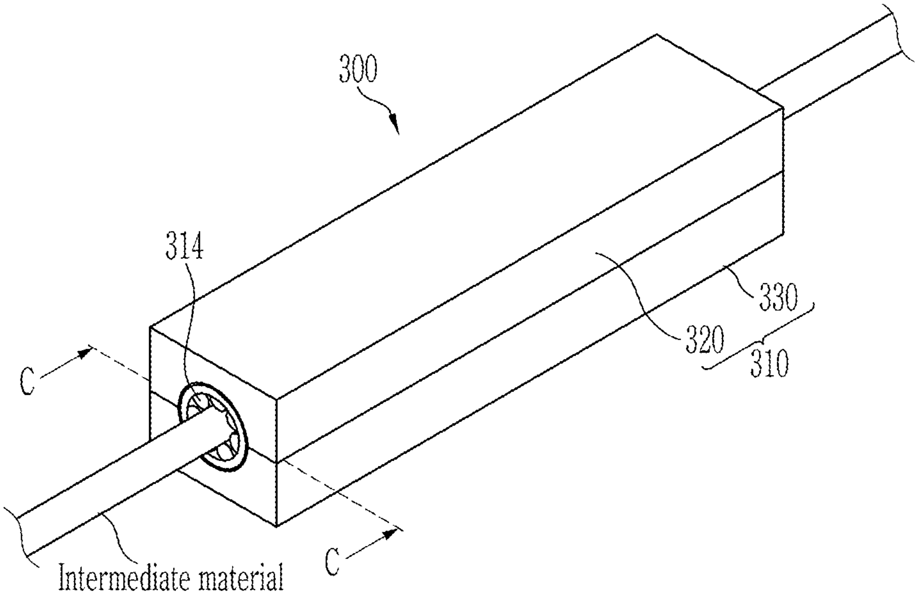
FIG. 8 is a perspective view illustrating a configuration of a rotation device according to an embodiment of the present disclosure.
Figure 9:
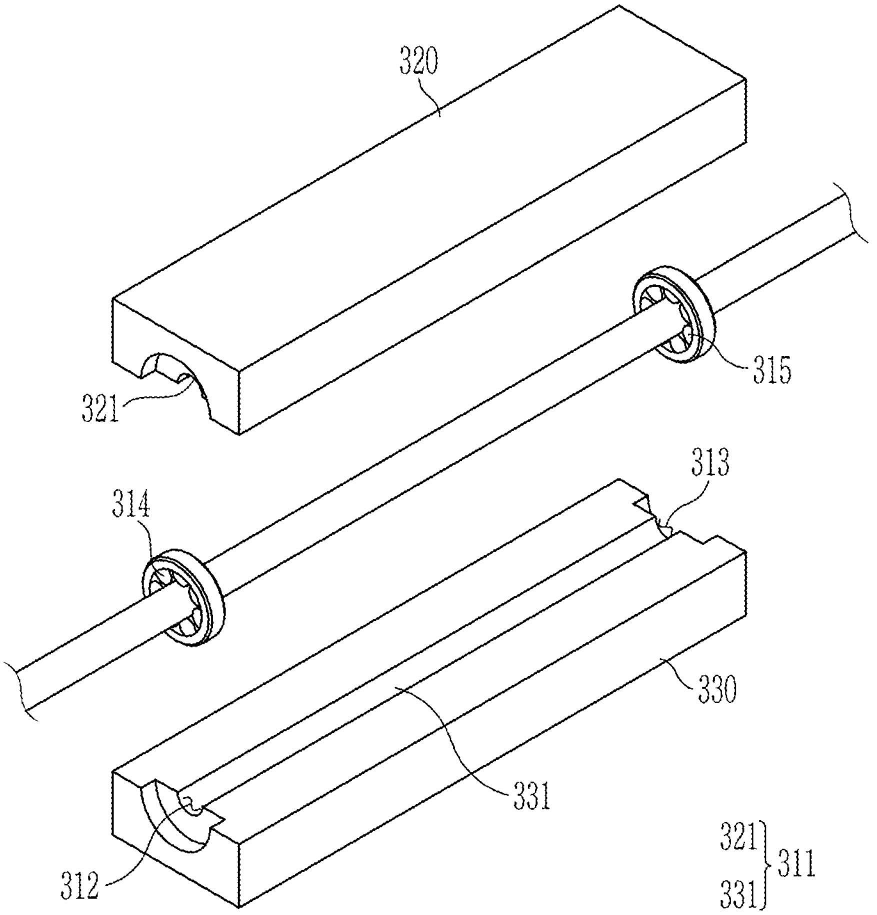
FIG. 9 is an exploded perspective view illustrating a configuration of a rotation device according to an embodiment of the present disclosure.
Figure 10:
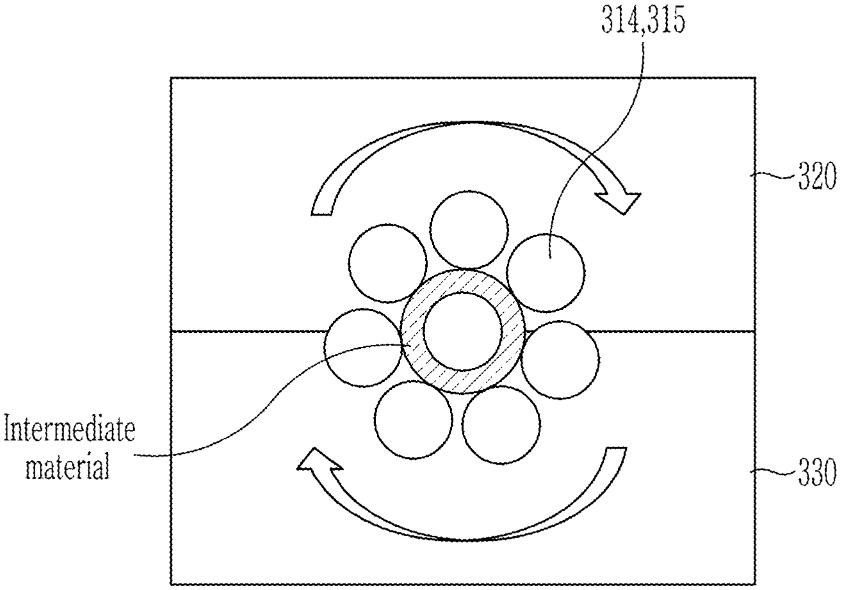
FIG. 10 is a cross-sectional view taken along line "C-C" in FIG. 8 according to an embodiment of the present disclosure.

FIG. 8 is a perspective view illustrating a configuration of a rotation device according to an embodiment of the present disclosure. FIG. 9 is an exploded perspective view illustrating a configuration of a rotation device according to an embodiment of the present disclosure. FIG. 10 is a cross-sectional view taken along line "C-C" in FIG. 8 according to an embodiment of the present disclosure.

With reference to FIGS. 8 to 10, the rotation device 300 may include a rotation body 310, a rotation inlet 312 formed in the rotation body 310, a rotation outlet 313 formed in the rotation body 310, inlet rollers 314 provided in the rotation inlet 312, and outlet rollers 315 provided in the rotation outlet 313.

The rotation body 310 may be provided in the form of an approximately quadrangular block, and a cylindrical rotation hole 311, in which the intermediate material may move, may be formed in the rotation body 310.

The rotation body 310 may include a first rotation body 320, and a second rotation body 330 provided below the first rotation body 320.

The first rotation body 320 can be provided in the form of an approximately quadrangular block, and a first rotation part having a cross-section with a semicircular shape can be formed on a lower portion of the first rotation body 320. The second rotation body 330 can be provided in the form of an approximately quadrangular block, and a second rotation part having a cross-section with a semicircular shape can be formed on an upper portion of the second rotation body 330. The first rotation part and the second rotation part may collectively define the cylindrical rotation hole 311. The rotation inlet 312 can be formed at an upstream side of the rotation hole 311, and the rotation outlet 313 can be formed at a downstream side of the rotation hole 311.

The inlet rollers 314 may be provided as a plurality of inlet rollers 314 provided in a circumferential direction of the rotation inlet 312. The inlet rollers 314 can press the intermediate material, which can be introduced into the rotation inlet 312, in the circumferential direction with a preset pressure, such that the carbon fiber having the outer surface, around which the solidified initial resin material can be wound, can be bonded to the outer surface of the initial resin material, and the epoxy resin may be impregnated with the initial resin material and the carbon fiber.

Figure 11:
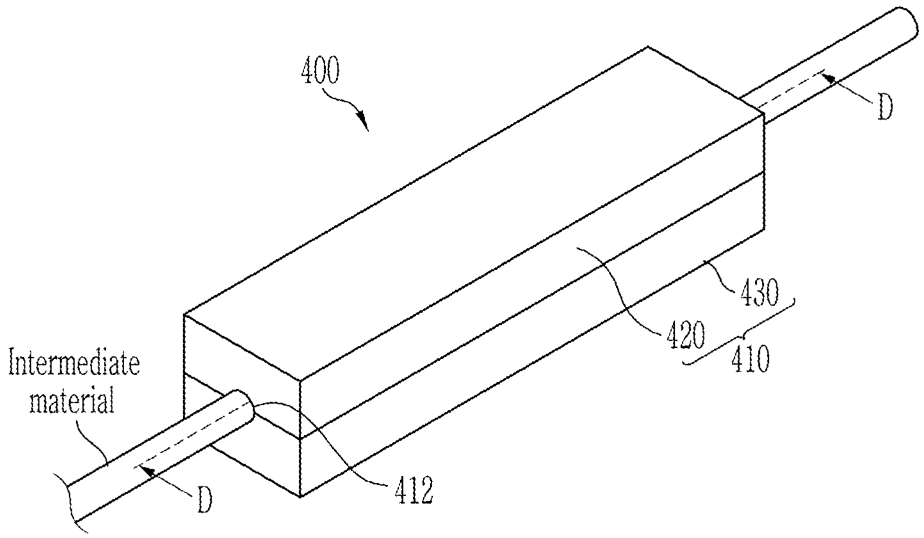
FIG. 11 is a perspective view illustrating a configuration of a pultrusion device according to an embodiment of the present disclosure.
Figure 12:
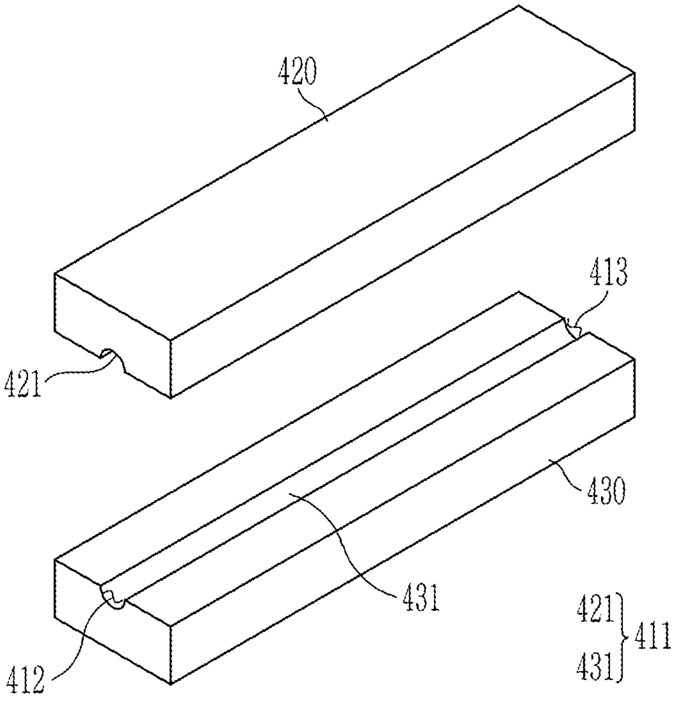
FIG. 12 is an exploded perspective view illustrating a configuration of a pultrusion device according to an embodiment of the present disclosure.
Figure 13:
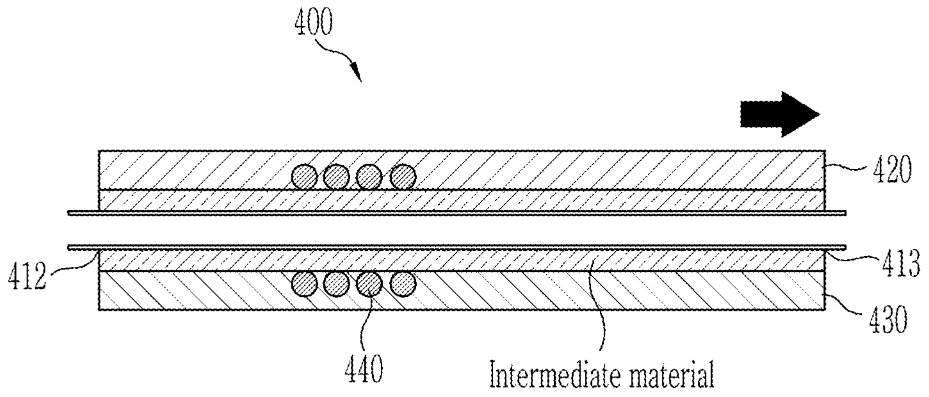
FIG. 13 is a cross-sectional view taken along line "D-D" in FIG. 11 according to an embodiment of the present disclosure.

FIG. 11 is a perspective view illustrating a configuration of a pultrusion device according to an embodiment of the present disclosure. FIG. 12 is an exploded perspective view illustrating a configuration of a pultrusion device according to an embodiment of the present disclosure. FIG. 13 is a cross-sectional view taken along line "D-D" in FIG. 11 according to an embodiment of the present disclosure.

With reference to FIGS. 11 to 13, the pultrusion device 400 may include a pultrusion body 410, a pultrusion inlet 412 formed in the pultrusion body 410, a pultrusion outlet 413 formed in the pultrusion body 410, and pultrusion rollers 440 provided in the pultrusion body 410.

The pultrusion body 410 may be provided in the form of an approximately quadrangular block, and a pultrusion hole 411, in which the intermediate material may move, may be formed in the pultrusion body 410.

The pultrusion body 410 may include a first pultrusion body 420, and a second pultrusion body 430 provided below the first pultrusion body 420.

The first pultrusion body 420 may be provided in the form of an approximately quadrangular block, and a first pultrusion part having a cross-section with a semicircular shape may be formed on a lower portion of the first pultrusion body 420. The second pultrusion body 430 may be provided in the form of an approximately quadrangular block, and a second pultrusion part having a cross-section with a semicircular shape may be formed on an upper portion of the second pultrusion body 430. The first pultrusion part and the second pultrusion part may collectively define the cylindrical pultrusion hole 411. The pultrusion inlet 412, through which the intermediate material can be introduced, can be formed at an upstream side of the pultrusion hole 411, and the pultrusion outlet 413, through which the intermediate material can be discharged, can be formed at a downstream side of the pultrusion hole 411.

The pultrusion rollers 440 may be provided as a plurality of pultrusion rollers 440 provided in the pultrusion body 410. For example, the plurality of pultrusion rollers 440 may be provided in the longitudinal direction of the intermediate material and provided in the circumferential direction of the intermediate material.

The pultrusion rollers 440 can rotate while applying a set, selected, or predetermined pressure to the intermediate material passing through the pultrusion hole 411. That is, the intermediate material introduced into the pultrusion inlet 412 can receive a set, selected, or predetermined pressure in the circumferential and diameter directions from the pultrusion roller 440 while passing through the pultrusion hole 411, such that the intermediate material can be stretched in the longitudinal direction. The intermediate material with the increased length can be discharged through the pultrusion outlet 413.

Referring to FIG. 1, a rotation support device 500 may be provided between the winding device 200 and the rotation device 300 and/or between the rotation device 300 and the pultrusion device 400 and can support the intermediate material discharged from the winding device 200 so that the intermediate material can be rotatable. The rotation support device 500 may include a rotation support body, and a rotation bearing (or rotation roller) provided in the rotation support body and configured to support the outer surface of the intermediate material so that the intermediate material can be rotatable.

In addition, a drive part 600 can be positioned in the rotation support device 500, and the drive part 600 can rotate the intermediate material, which can be discharged from the winding device 200, in the circumferential direction. The drive part 600 may be an electric motor, for example.

Hereinafter, a method of manufacturing a hydrogen tank according to an embodiment of the present disclosure will be described in detail with reference to the accompanying drawings.

Figure 14:
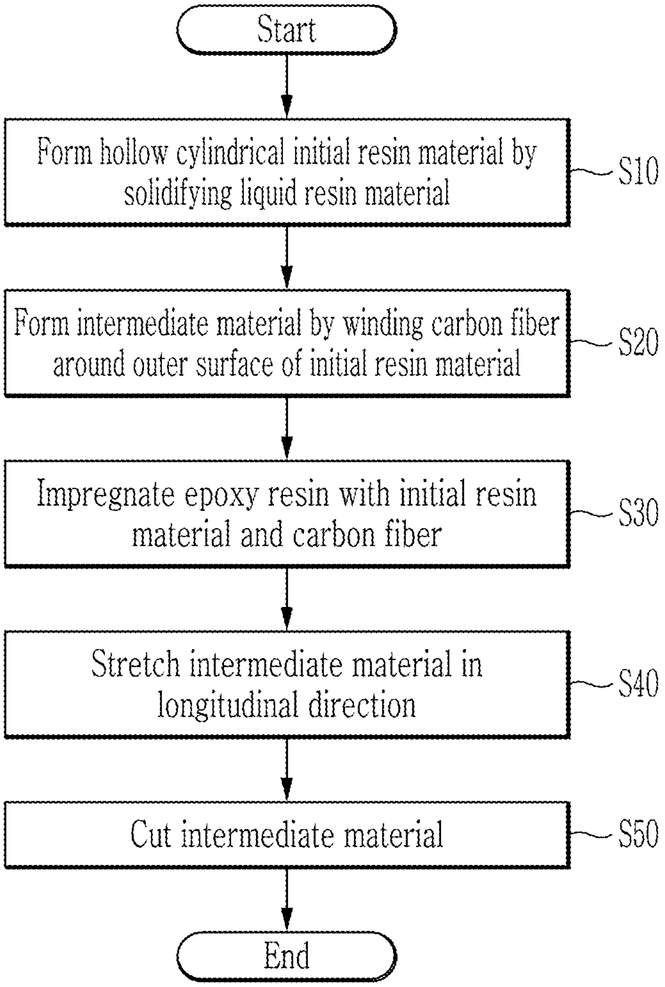
FIG. 14 is a flowchart illustrating a method of manufacturing a hydrogen tank according to an embodiment of the present disclosure.

FIG. 14 is a flowchart illustrating a method of manufacturing a hydrogen tank according to an embodiment of the present disclosure.

With reference to FIGS. 1 to 14, the hollow cylindrical initial material can be formed by solidifying the liquid resin material, and the initial material can be discharged through the molding outlet 112 of the molding body 110 (operation S10).

Specifically, when the liquid resin material is introduced through the material inlet of the molding device 100, the resin material can be inserted into the empty space defined between the outer surface of the cylindrical mandrel 140 and the inner surface of the molding hole 111 of the molding body 110, and the liquid resin material can be solidified, such that the cylindrical initial material can be formed.

In case that the resin inlet can be provided as a plurality of resin inlets, the injection pressure (second resin injection pressure) of the resin material injected through the second resin inlet 132 formed in the lower portion of the molding body 110 may be higher than the injection pressure (first resin injection pressure) of the resin material injected through the first resin inlet 122 formed in the upper portion of the molding body 110. Because the second resin injection pressure can be higher than the first resin injection pressure as described above, a cylindrical portion of the mandrel 140 may be prevented from being bent in the gravitational direction by its weight, and the initial resin material with a uniform thickness may be formed.

The winding device 200 can form the intermediate material by winding the carbon fiber around the outer surface of the initial resin material (operation S20).

Specifically, the initial material discharged through the molding outlet 112 can be introduced into the winding hole 211 through the winding inlet 212 of the winding body 210. The carbon fiber introduced through the carbon fiber inlet 214 of the winding body 210 surrounds the outer surface of the initial resin material, such that the intermediate material can be formed. The intermediate material can be discharged through the winding outlet 213 of the winding body 210. The carbon fiber and the epoxy resin can be introduced through the carbon fiber inlet 214.

The rotation device 300 can rotate the intermediate material to impregnate the epoxy resin with the initial resin material and the carbon fiber (operation S30).

Specifically, the intermediate material introduced through the rotation inlet 312 of the rotation device 300 can rotate while being pressed in the diameter direction by the plurality of inlet rollers 314 provided in the rotation inlet 312. Further, the intermediate material discharged through the rotation outlet 313 of the rotation device 300 can rotate while being pressed by the plurality of outlet rollers 315 provided in the rotation outlet 313. That is, the inlet rollers 314 and the outlet rollers 315 can rotate while applying the preset pressure to the intermediate material in the diameter direction.

As described above, the outer surface of the intermediate material can be rotated while being pressed by the inlet rollers 314 and the outlet rollers 315, such that the epoxy resin may be stably impregnated with the initial resin material and the carbon fiber.

The pultrusion device 400 can stretch the intermediate material, which has passed through the rotation device 300, in the longitudinal direction (operation S40).

Specifically, the intermediate material can be introduced into the pultrusion hole 411 through the pultrusion inlet 412 of the pultrusion device 400. The plurality of pultrusion rollers 440 can rotate while applying a set, selected, or predetermined pressure to the outer surface of the intermediate material, such that the intermediate material can be stretched in the longitudinal direction. The intermediate material with the increased length can be discharged through the pultrusion outlet 413.

The intermediate material discharged through the pultrusion device 400 can be cut into an appropriate size by a separate cutting device, and the hydrogen tank opened at upper and lower sides thereof can be sealed by a separate process (operation S50).

The initial resin material and the intermediate material can be continuously rotated by the drive part 600 provided between the winding device 200 and the rotation device 300. Therefore, the respective processes can be performed while the initial resin material, which has passed through the molding device 100, the intermediate material, which has passed through the winding device 200, the intermediate material, which has passed through the rotation device 300, and the intermediate material, which has passed through the pultrusion device 400, can be continuously rotated by the drive part 600.

According to an embodiment of the present disclosure, the molding process of forming the initial resin material (liner) used to manufacture the hydrogen tank, the winding process of winding the carbon fiber around the initial resin material, the rotation process of impregnating the epoxy material with the initial resin material and the carbon fiber, and the pultrusion process of stretching the intermediate material may be implemented by a single continuous process.

Therefore, using an embodiment of the present disclosure, it can be possible to reduce costs required to manufacture the hydrogen tank and to ensure the quality of the hydrogen tank.

While the example embodiments of the present disclosure have been described above, the present disclosure is not limited thereto, and various modifications can be made and carried out within the scope of the claims, the detailed description of the disclosure, and the accompanying drawings, and also fall within the scope of the disclosure.

What is claimed is:

1. An apparatus for manufacturing a hydrogen tank, the apparatus comprising:

a molding device configured to form a hollow cylindrical initial resin material body by solidifying a liquid resin material;

a winding device provided at a molding device downstream side of the molding device and configured to form an intermediate material by winding a carbon fiber around a material outer surface of the hollow cylindrical initial resin material body formed by the molding device;

a rotation device provided at a winding device downstream side of the winding device and configured to impregnate an epoxy resin with the hollow cylindrical initial resin material body and the carbon fiber by rotating the intermediate material formed by the winding device; and a pultrusion device provided at a rotation device downstream side of the rotation device and configured to stretch the intermediate material, which has passed through the rotation device, in a longitudinal direction, wherein the winding device comprises:

a winding body having a winding hole therein;

a winding inlet in the winding body and the winding inlet being configured to allow the hollow cylindrical initial resin material body to be introduced through the winding inlet;

a winding outlet in the winding body and the winding outlet being configured to allow the intermediate material to be discharged through the winding outlet; and a carbon fiber inlet in the winding body and the carbon fiber inlet being configured to allow the carbon fiber and the epoxy resin to be introduced through the carbon fiber inlet.

2. The apparatus of claim 1, wherein the winding body further comprises:

a first winding body having a first winding groove; and a second winding body having a second winding groove, wherein the first winding groove and the second winding groove collectively define the winding hole.

3. The apparatus of claim 1, wherein the rotation device comprises:

a rotation body having a rotation hole therein;

a rotation inlet in the rotation body and the rotation inlet being configured to allow the intermediate material, which is discharged from the winding device, to be introduced through the rotation inlet;

a rotation outlet in the rotation body and the rotation outlet being configured to allow the intermediate material, which passes through the rotation body, to be discharged through the rotation outlet;

a plurality of inlet rollers provided in the rotation inlet and configured to guide the intermediate material in a circumferential direction; and a plurality of outlet rollers provided in the rotation outlet and configured to guide the intermediate material in the circumferential direction.

4. The apparatus of claim 3, wherein the rotation body further comprises:

a first rotation body having a first rotation groove; and a second rotation body having a second rotation groove, wherein the first rotation groove and the second rotation groove collectively define the rotation hole.

5. The apparatus of claim 3, wherein the inlet rollers and the outlet rollers are configured to rotate while applying a preset pressure in a diameter direction of the intermediate material.

6. The apparatus of claim 1, wherein the pultrusion device comprises:

a pultrusion body having a pultrusion hole therein, the pultrusion body having a pultrusion inlet through which the intermediate material discharged from the rotation device is introduced, and a pultrusion outlet through which the intermediate material is discharged from the pultrusion body; and a plurality of pultrusion rollers provided in the pultrusion body, the pultrusion rollers being configured in the longitudinal direction of the intermediate material having passed through the rotation device.

7. The apparatus of claim 1, wherein the winding device and the molding device are in contact with each other.

8. An apparatus for manufacturing a hydrogen tank, the apparatus comprising:

a molding device configured to form a hollow cylindrical initial resin material body by solidifying a liquid resin material;

a winding device provided at a molding device downstream side of the molding device and configured to form an intermediate material by winding a carbon fiber around a material outer surface of the hollow cylindrical initial resin material body formed by the molding device;

a rotation device provided at a winding device downstream side of the winding device and configured to impregnate an epoxy resin with the hollow cylindrical initial resin material body and the carbon fiber by rotating the intermediate material formed by the winding device; and a pultrusion device provided at a rotation device downstream side of the rotation device and configured to stretch the intermediate material, which has passed through the rotation device, in a longitudinal direction, wherein the rotation device comprises:

a rotation body having a rotation hole therein;

a rotation inlet in the rotation body and the rotation inlet being configured to allow the intermediate material, which is discharged from the winding device, to be introduced through the rotation inlet;

a rotation outlet in the rotation body and the rotation outlet being configured to allow the intermediate material, which passes through the rotation body, to be discharged through the rotation outlet;

a plurality of inlet rollers provided in the rotation inlet and configured to guide the intermediate material in a circumferential direction; and a plurality of outlet rollers provided in the rotation outlet and configured to guide the intermediate material in the circumferential direction.

9. The apparatus of claim 8, wherein the rotation body further comprises:

a first rotation body having a first rotation groove; and a second rotation body having a second rotation groove, wherein the first rotation groove and the second rotation groove collectively define the rotation hole.

10. The apparatus of claim 8, wherein the inlet rollers and the outlet rollers are configured to rotate while applying a preset pressure in a diameter direction of the intermediate material.

11. An apparatus for manufacturing a hydrogen tank, the apparatus comprising:

a molding device configured to form a hollow cylindrical initial resin material body by solidifying a liquid resin material;

a winding device provided at a molding device downstream side of the molding device and configured to form an intermediate material by winding a carbon fiber around a material outer surface of the hollow cylindrical initial resin material body formed by the molding device;

a rotation device provided at a winding device downstream side of the winding device and configured to impregnate an epoxy resin with the hollow cylindrical initial resin material body and the carbon fiber by rotating the intermediate material formed by the winding device; and a pultrusion device provided at a rotation device downstream side of the rotation device and configured to stretch the intermediate material, which has passed through the rotation device, in a longitudinal direction wherein the pultrusion device comprises:

a pultrusion body having a pultrusion hole therein, the pultrusion body having a pultrusion inlet through which the intermediate material discharged from the rotation device is introduced, and a pultrusion outlet through which the intermediate material is discharged from the pultrusion body; and a plurality of pultrusion rollers provided in the pultrusion body, the pultrusion rollers being configured in the longitudinal direction of the intermediate material having passed through the rotation device.

12. The apparatus of claim 11, wherein the pultrusion rollers are configured to rotate while applying a selected pressure to the intermediate material passing through the pultrusion hole.

* * * * *